Patented May 25, 1943

2,320,058

UNITED STATES PATENT OFFICE 2,320,058

PROCESS OF PRODUCING A STABLE, COMPLEX COMPOUND FOR USE AS A FLOUR BLEACHING AGENT AND AS A CONVENIENT SOURCE OF NITROGEN OXIDES

Souren Z. Avedikian, Baltimore, Md.

No Drawing. Application October 7, 1939,
Serial No. 298,406

6 Claims. (Cl. 99—232)

This application is a continuation in part of application Serial No. 88,837, filed July 3, 1936, which has matured in to Patent No. 2,175,172 to issue October 10, 1939, and contains matter which has been divided out of the above-mentioned application. In said application, a new material which bleaches flour has been described together with a process of treating flour with said new material to bleach and to mature it. This application describes the process I have discovered for producing the new bleaching and maturing agent for flour. This material is also a good and convenient source of oxides of nitrogen.

I have found that this bleaching and maturing agent can be easily prepared to yield satisfactory and effective results by processes which I have devised and will describe, using relatively inexpensive starting materials. In the preferred embodiment of my invention, I use sulfur trioxide and sodium nitrite. The union of these two compounds under the conditions of the processes I have developed produces the complex addition compound which is the active principle of the bleaching agent. The reaction product is a white solid. It can be easily ground to a fine powder. It is non-toxic in use, acts on the color in the flour or the milling product, is highly effective in whitening, and produces improvement in the quality of the flour. In bleaching by this method, the substances added are natural to flour.

I have found that this active, complex addition compound can be successfully prepared by directly bringing together the ingredients, with agitation, and that the sulfur trioxide may be thus utilized in either the liquid or the gaseous state.

It appears that when sodium nitrite, or its equivalent, and sulfur trioxide are brought together a combination or union takes place between them as follows:

$$x(NaNO_2) + y(SO_3) \rightarrow (Na)_x(SO_3)_y(NO_2)_x$$

where, when $$x=2 \text{ to } 4, y=1$$

and when $$x=1, y=1 \text{ to } 3$$

The compound formed appears to be of the same general type of complex compounds to which certain ammonia complexes belong, e. g., $Cu(NH_3)_4^{++}$, $Ag(NH_3)_2^+$, $Ni(NH_3)_x^{++}$, etc. in which the metallic ion behaves as if there were a number of ammonia molecules attached to it. In the present case, the addition compound behaves as if there were either a number of sulfur trioxide molecules attached to the sodium nitrite 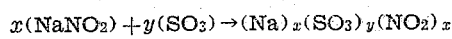 molecule or a number of sodium nitrite molecules attached to the sulfur trioxide molecule. I find that by my process of preparation I can put into the addition compound any quantity of sulfur trioxide less than three molecules. Thus, this compound can be made in various gradations by my process, such that sulfur trioxide varies from one mole per two moles of sodium nitrite to one to one, etc. The former I have found to be preferred as a bleach for flour.

According to one form of my process for preparing the complex addition compound, I may take 80 grams of sulfur trioxide in the liquid state and add to it slowly, with agitation, 69 to 138 grams of sodium nitrite, preferably well ground. Or, I may add the liquid sulfur trioxide slowly to the solid powdered sodium nitrite first placed into the reaction chamber. The reaction producing the addition compound is highly exothermic. Therefore, I prefer to keep the reaction chamber and its contents relatively cool by surrounding the vessel with cold water or a stream of liquid to dissipate the heat. I find that temperatures of the surrounding medium between 15° and 40° C. at ordinary pressures are satisfactory, but other temperatures and pressures may be used. The formation of this compound is rapid and the reaction reaches completion in a relatively short time. I prefer, however, to let the reaction mixture stand for a few hours before further treatment. After about 3–4 hours or more, as the case may be, I remove the contents of the vessel, break up the coarse aggregates that may have formed, and, preferably after admixture with a water absorbing (or adsorbing) material, such as active clay, anhydrous sodium sulfate, anhydrous calcium sulfate, colloidal silica, silica gel, etc., I grind it to a fine powder. This fine powder acts as an effective bleach and improver for flour. The color of flour is lightened considerably and the resulting bread has a lighter appearance and the loaf is larger in volume than ordinarily. This fine powder is also a convenient source of oxides of nitrogen ($N_2O_4$, $NO$, $N_2O_3$) which can be generated by causing the complex addition compound to react with water.

As an alternative procedure, place 69 to 138 grams of sodium nitrite in a reaction chamber which is equipped to maintain the solid substance in a state of constant agitation, either by tumbling as in a ball mill or a tumbling mixer, or by means of a rotating agitator within a stationary shell. The chamber should preferably be designed to dissipate the heat of the reaction quickly and effectively as by a cooling-water jacket, etc. Then, after the agitation has been started, lead into the chamber a stream of sulfur trioxide in the gaseous state, either pure undiluted sulfur trioxide or this gas diluted with an inert gas such as air, nitrogen, carbon dioxide, etc. The term "inert" is used here in the sense that the diluting gas does not itself take part in the reaction but is instrumental merely in supplying sulfur trioxide in smaller quantities than would otherwise be possible, in the event that a slower and a better controlled reaction with sodium nitrite is desired. When the required amount of sulfur trioxide has been passed into the reaction chamber, i. e., to produce a compound from 1:1 to 2:1 in ratio with respect to sodium nitrite and sulfur trioxide as desired, discontinue the stream of sulfur trioxide and allow the mixture to stand for a few hours and then grind it to a fine powder in the presence of a water adsorbent material such as anhydrous sodium sulfate, silica gel, etc., singly or in combinations of two or more.

The following are specific examples:

*Example I*

| | Parts |
|---|---|
| Sulfur trioxide | 80 |
| Sodium nitrite | 69 |
| Sodium sulfate (anhydrous) | 16 |

To the sulfur trioxide in the liquid state is added, slowly with stirring, in a cooled vessel the sodium nitrite. The agitation and cooling are continued until the reactivity of the mixture ceases. The mixture is now allowed to stand a few hours in the cooling bath, after which it will be ready to grind and pulverize. After breaking up coarse aggregates, the anhydrous sodium sulfate is admixed and the whole is ground to a fine powder in a suitable mill, e. g. a ball mill.

*Example II*

| | Parts |
|---|---|
| Sulfur trioxide | 80 |
| Sodium nitrite | 138 |
| Sodium sulfate (anhydrous) | 24 |

The reaction and the subsequent operations may be carried out as described under Example I.

This material is valuable as a bleaching and maturing agent for flour and as a convenient source of nitrogen oxides because of its ability to react with moisture thus liberating the oxides of nitrogen. Hence, care must be exercised to prevent this reaction from occurring either in the course of manufacture or afterwards until the liberated oxides of nitrogen can be utilized as in the flour itself in which, after admixture therewith, the liberation of the gases takes place. It is desirable to carry out the manufacturing operations, as well as to store the material, in a relatively dry atmosphere. The starting materials should preferably be dried before use. In this connection, the following steps may be taken: (1) the raw materials may be dried thoroughly; (2) the reaction may be carried out in such a way as to have a slight leakage of gaseous $SO_3$ outward to prevent ingress of moist air; (3) absorbent or adsorbent materials may be incorporated with the product; (4) the product may be stored in well-stoppered, air-tight containers; and (5) the various manufacturing operations may be carried out in a conditioned, dry atmosphere and the product stored in such an atmosphere. These various conditions may be met singly or in any combinations, or may be omitted altogether in the production of the complex addition compound.

It is essential for the preparation of a satisfactory and uniform product that constant agitation of the solid, powdery material be maintained. Unless this is done, the product does not function satisfactorily as a bleaching or maturing agent for flour or as an efficient source of oxides of nitrogen.

The above description details in general terms the methods that may be employed to produce my flour bleaching and maturing compound. In the preferred embodiment of my invention, I employ the following procedure and equipment as indicated:

1. I dry the sodium nitrite to remove practically all of the moisture contained therein.

2. I then grind it to a fine powder such that 100% will pass through 150 mesh.

3. I prefer to use a reaction chamber consisting of a horizontal, jacketed mixer equipped with a heavy-duty, horizontally-mounted agitator (such as are used for powder and paste mixing) and a gasketed, gas-tight cover.

4. I place 2000 grams of the finely ground sodium nitrite into the mixer or reaction chamber. I close the vessel and start the agitator.

5. I admit pure, gaseous $SO_3$ distilled from fuming sulfuric acid (preferably 20% oleum) into the mixer at such a rate as to permit maintenance of the temperature of the charge at preferably about 60° C. The $SO_3$ may be admitted more rapidly if the reaction mixture is cooled as for example by circulating cooling water through the jacket of the reaction vessel. It is desirable that the temperature of the reaction vessel and contents be above the boiling point of $SO_3$ in order to maintain an atmosphere of $SO_3$ within the reaction vessel at all times.

6. The reaction proceeds smoothly. Gaseous $SO_3$ is passed into the vessel until the required amount of $SO_3$ (1160 grams) plus a 0.5 to 3% excess has been added over a period of 3 to 4 hours. Agitation of the reaction vessel contents may be continued for an hour or two longer after the stream of $SO_3$ has been stopped, or the product may be discharged from the vessel immediately, and then used in the next step in the manufacturing process.

7. The product is discharged from the reaction vessel directly into a grinding or pulverizing machine to grind it to a fine powder, or it may be discharged to an intermediate storage space first before it is ground.

8. The complex addition compound is then ground to a fine powder and then admixed with a small amount of a previously well-ground adsorbent material such as silica gel, active clay, etc. This adsorbing material being itself capable of absorbing or adsorbing moisture tends to keep the product dry in storage. In the preferred embodiment of my invention, I use 5 to 10% of the adsorbent material, silica gel, having a fineness of 150 to 200 mesh. I previously grind the complex addition compound to a fineness of 100 to 150 mesh before mixing the adsorbing material with it.

9. The powdered bleaching agent is then packed in glass bottles fitted with gas-tight covers or caps.

The various steps in the manufacturing operation are preferably carried out in an air conditioned room having an atmosphere of very low humidity.

The product obtained from this reaction would have a nitrite to sulfur trioxide molecular ratio of 2 to 1.

The substances, quantities, and the procedure described above are in accordance with the preferred embodiment of my invention relating to the preparation of the complex addition compound which I have discovered to be valuable as a flour bleach and maturer. The product obtained by the procedure described, I have found, produces optimum bleaching and maturing action on flour. I have found, however, that variations within the quantities above specified and also outside those quantities are possible for the production of a dry powdery substance capable of bleaching flour. The ratio of sodium nitrite to sulfur trioxide may vary from 1:2 or less to 2:1 and even higher, for example 4:1, with a resulting product which upon reacting with water or moisture liberates nitrogen oxides. The liberation of oxides of nitrogen, however, does not appear to be complete when the ratio is greater than 2:1. On the other hand, the bleaching effect of the compound on flour and the like would be considerably diminished if the ratio should closely approach 1:3. All such variations are intended to be within the scope of this invention.

The sulfur trioxide used in the manufacture of the complex addition compound may be obtained by distillation from fuming sulfuric acid, by the catalytic oxidation of sulfur dioxide, etc.

The foregoing description and the examples given above have mentioned sodium nitrite. This has been done merely for the sake of clarity in the exposition and with no intention of limiting myself to the use of sodium nitrite solely. The nitrites of lithium, potassium, and calcium, i. e., those which are capable of forming an addition compound with sulfur trioxide analogous to that of sodium nitrite, are equivalents of sodium nitrite for the purpose of my invention.

Having thus broadly outlined my invention, and having specifically described the preferred embodiment of my invention, I claim the following:

1. The process of preparing a flour-bleaching compound, which comprises mixing sulfur trioxide and the nitrite of a metal of the group consisting of lithium, sodium, and potassium in such proportions that the ratio of the sulfur trioxide molecules to metal nitrite molecules is approximately 1 to 2 and less than 1 to 1, and obtaining a uniform product throughout the mass by mixing the ingredients thoroughly and quickly before they complete their reaction with one another so as to prevent the formation of the ultimate end product that contains one molecule of metallic nitrite combined with three molecules of sulfur trioxide.

2. The process of preparing a flour-bleaching compound, which comprises mixing sulfur trioxide in the liquid state and a nitrite of a metal of the group consisting of lithium, sodium, and potassium with the nitrite of the metal in a powdery state, and with the ingredients in such proportions that the ratio of the sulfur trioxide molecules to metal nitrite molecules is approximately 1 to 2 and less than 1 to 1, and obtaining a uniform product throughout the mass by agitating the liquid and powder so as to mix them thoroughly and quickly before they complete a reaction with one another that produces an ultimate end product containing one molecule of metallic nitrite combined with three molecules of sulfur trioxide.

3. The process of preparing a flour-bleaching compound, which comprises mixing sulfur trioxide in the gaseous state with a powdered nitrite of a metal of the group consisting of lithium, sodium, and potassium in such proportions that the ratio of the sulfur trioxide molecules to metal nitrite molecules is approximately 1 to 2 and less than 1 to 1, and obtaining a uniform product by agitating the ingredients so as to mix them thoroughly and quickly before they complete a reaction with one another that produces an ultimate end product containing one molecule of metallic nitrite combined with three molecules of sulfur trioxide.

4. The process of preparing a flour-bleaching compound, which comprises mixing sulfur trioxide in the gaseous state diluted with an inert gas and sodium nitrite in the form of a fine powder in such proportions that the ratio of sulfur trioxide molecules to sodium nitrite molecules is approximately 1 to 2 and less than 1 to 1, and obtaining a uniform product by thoroughly mixing the diluted sulfur trioxide gas and sodium nitrite before they react with one another and produce the ultimate end product containing one molecule of sodium nitrite combined with three molecules of sulfur trioxide.

5. The process of preparing a flour-bleaching compound, which comprises mixing sulfur trioxide and the nitrite of a metal of the group consisting of lithium, sodium, and potassium in such proportions that the ratio of the sulfur trioxide molecules to metal nitrite molecules is approximately 1 to 2 and less than 1 to 1, obtaining a uniform product by mixing the ingredients thoroughly before they complete a reaction to the ultimate end product containing one molecule of metallic nitrite combined with three molecules of sulfur trioxide, grinding the reacted mass to a fine powder, and adding to the powder an adsorbing agent taken from the group consisting of silica gel, colloidal silica, and active clay.

6. The process of preparing a complex, addition compound, which comprises bringing together gaseous sulfur trioxide and powdery sodium nitrite in a dry atmosphere at substantially 60° C., mixing the sulfur trioxide and sodium nitrite in such proportions that the ratio of sulfur trioxide molecules to metal nitrite molecules is approximately 1 to 2 and less than 1 to 1, obtaining a uniform compound by maintaining the powdery nitrite in a state of constant agitation while leading into it sulfur trioxide in a gaseous state so that the nitrite and the sulfur trioxide are thoroughly mixed before they can react with one another to form an ultimate end product that contains one molecule of sodium nitrite combined with three molecules of sulfur trioxide, excluding moisture from the mixture during the reaction of the nitrite and sulfur trioxide, grinding the reacted compound to a fine powder free of moisture, and adding to the powder a finely ground adsorbing agent such as silica gel which is capable of passing through 150–200 mesh screen.

SOUREN Z. AVEDIKIAN.